US008751868B2

United States Patent
Li et al.

(10) Patent No.: US 8,751,868 B2
(45) Date of Patent: Jun. 10, 2014

(54) CONTROL SERVER AND METHOD FOR SWITCHING RUNNING OF TEST PROGRAMS STORED IN MULTIPLE STORAGE MEDIUMS OF TEST SERVER

(75) Inventors: Ming Li, Shenzhen (CN); Li-Qun Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 198 days.

(21) Appl. No.: 13/434,859

(22) Filed: Mar. 30, 2012

(65) Prior Publication Data
US 2012/0311385 A1 Dec. 6, 2012

(30) Foreign Application Priority Data
May 31, 2011 (CN) .......................... 2011 1 0144666

(51) Int. Cl.
*G06F 11/00* (2006.01)
(52) U.S. Cl.
USPC .................... 714/27; 714/25; 714/37; 714/46

(58) Field of Classification Search
USPC .................................. 714/25, 27, 36, 37, 46
See application file for complete search history.

(56) References Cited

U.S. PATENT DOCUMENTS

| | | | | |
|---|---|---|---|---|
| 2008/0209276 | A1* | 8/2008 | Stubbs et al. | 714/38 |
| 2009/0307763 | A1* | 12/2009 | Rawlins et al. | 726/5 |
| 2009/0327814 | A1* | 12/2009 | Watanabe | 714/38 |
| 2011/0055635 | A1* | 3/2011 | Vecera et al. | 714/37 |

* cited by examiner

*Primary Examiner* — Sarai Butler
(74) *Attorney, Agent, or Firm* — Novak Druce Connolly Bove + Quigg LLP

(57) ABSTRACT

A control sever electronically connects a test server via network interfaces. The test server includes multiple storage mediums that store multiple test programs for testing the test server. The control server includes a switching control unit. The switching control unit selects one storage medium from the storage mediums as a startup device of the test server, and sends a control command to run one or more test programs stored in the startup device. In response to receiving a test result from the test server, the switching control unit selects a next storage medium from the storage mediums as a new startup device, and runs one or more test programs stored in the new staring device until all the storage mediums have been selected as startup devices one by one.

16 Claims, 3 Drawing Sheets

CONTROL SERVER AND METHOD FOR SWITCHING RUNNING OF TEST PROGRAMS STORED IN MULTIPLE STORAGE MEDIUMS OF TEST SERVER

BACKGROUND

1. Technical Field

Embodiments of the present disclosure relate to server test systems and methods, and more particularly, to a control server and a method for switching running of test programs stored within multiple storage mediums of a test server.

2. Description of Related Art

Server tests may refer to a number of tests, such as network capability tests, input/output (I/O) capability tests, and hardware component tests. For saving test time and improving test efficiency, test programs in relation to different tests may be arranged in different storage mediums of a server to be tested (hereinafter "test server") by test engineers, a test tool (such as a Single Chip Micyoco) may be electronically connected to the storage medium via programmable I/O pins. Then, running of the test programs stored in the storage mediums may be controlled by controlling level statuses (high or low) of the I/O pins. However, different types of storage mediums may have different definition of high/low levels, which may request the test engineers to do different settings in relation to different storage mediums. Furthermore, the aforementioned test method requires assistance of test tools.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
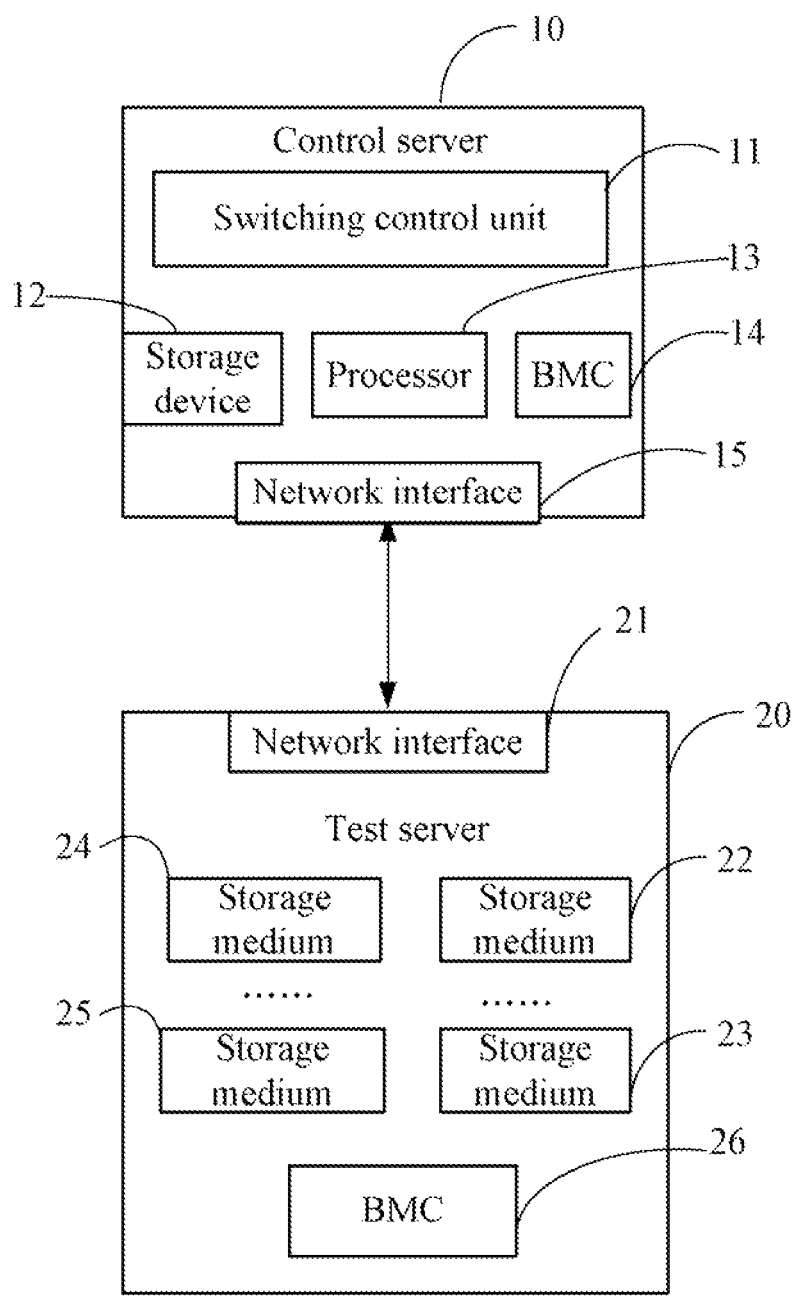
FIG. 1 is a block diagram of one embodiment of a control sever comprising a switching control unit for switching running of test programs stored in multiple storage mediums of a test server.

FIG. 1 is a block diagram of one embodiment of a control sever 10 including a switching control unit 11 for switching running of test programs stored in multiple storage mediums of a test server 20 The test server 20 is electronically connected to the control server 10 via network interfaces (e.g., RJ-45), such as a network interface 15 of the control server 10 and a network interface 21 of the control server 20. In one embodiment, the control server 10 and the test server 20 respectively include a baseboard management controller (BMC), such as the BMCs 13 and 26 shown in FIG. 1.

In one embodiment, the test server 20 includes multiple storage mediums, such as storage mediums 22-25 shown in FIG. 1. The multiple storage mediums may be the same type, or different types. For example, the types of the multiple storage mediums may include, but not limited to, CDs, DVDs, BLU-RAY, flash memory, and hard disk drives. Each of the multiple storage mediums stores one or more test programs for testing one test task of the test server 20. For example, the storage medium 22 may store one or more test programs for testing network capability of the test server 20, the storage medium 23 may store one or more test programs for testing input/output (I/O) capability of the test server 20, the storage medium 24 may store one or more test programs for testing a motherboard of the test server 20, and the storage medium 25 may store one or more test programs for testing fans of the test server 20.

In one embodiment, the switching control unit 11 selects one storage medium from the multiple storage mediums as a startup device of the test server 20, sends a control command to run the one or more test programs stored in the startup device, and monitors a test result in relation to the startup device sent by the test server. In response to receiving the test result, the switching control unit 11 further selects a next storage medium from the multiple storage mediums as a new startup device, and sends a next control command to run the one or more test programs stored in the new staring device until all of the multiple storage mediums have been selected as startup devices one by one, to achieve automatically running the test programs stored in the multiple storage mediums in turn.

Figure 2:
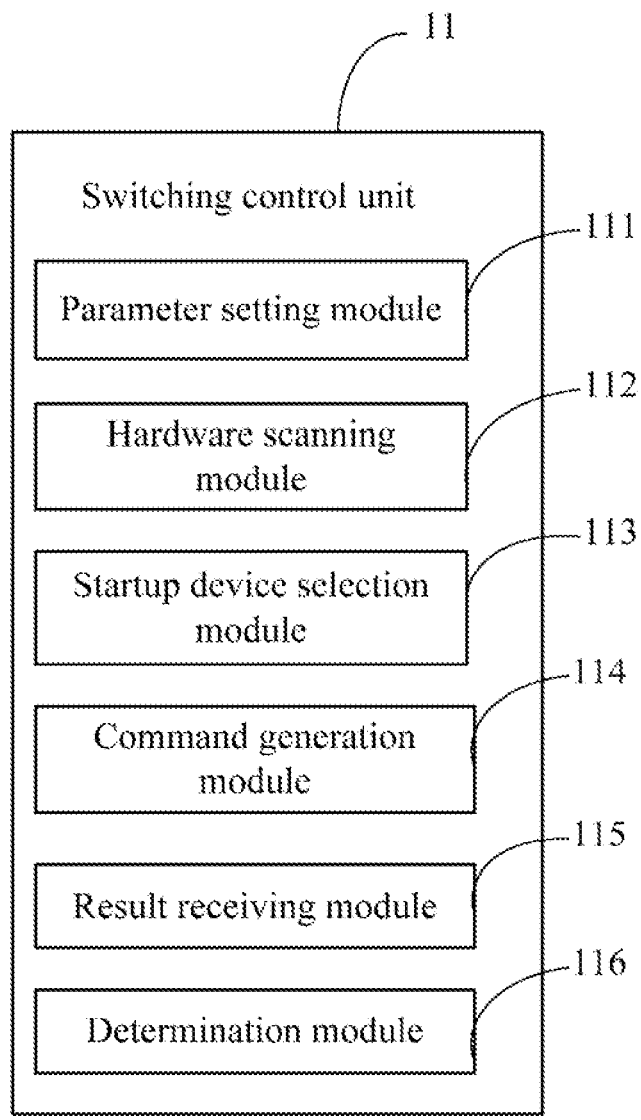
FIG. 2 is a block diagram of one embodiment of function modules of the switching control unit in FIG. 1.

As shown in FIG. 2, the switching control unit 11 includes a parameter setting module 111, a hardware scanning module 112, a startup device selection module 113, a command generation module 114, a result receiving module 115, and a determination module 116. The modules 111-116 may comprise computerized code in the form of one or more programs (computer-readable program code) that are stored in a storage device 12 of the control server 10. The computerized code includes instructions that are executed by a processor 13 of the control server to provide the functions of the modules 111-116 illustrated in FIG. 3. The storage device 12 may be a cache, an independent, or a dedicated memory.

Figure 3:
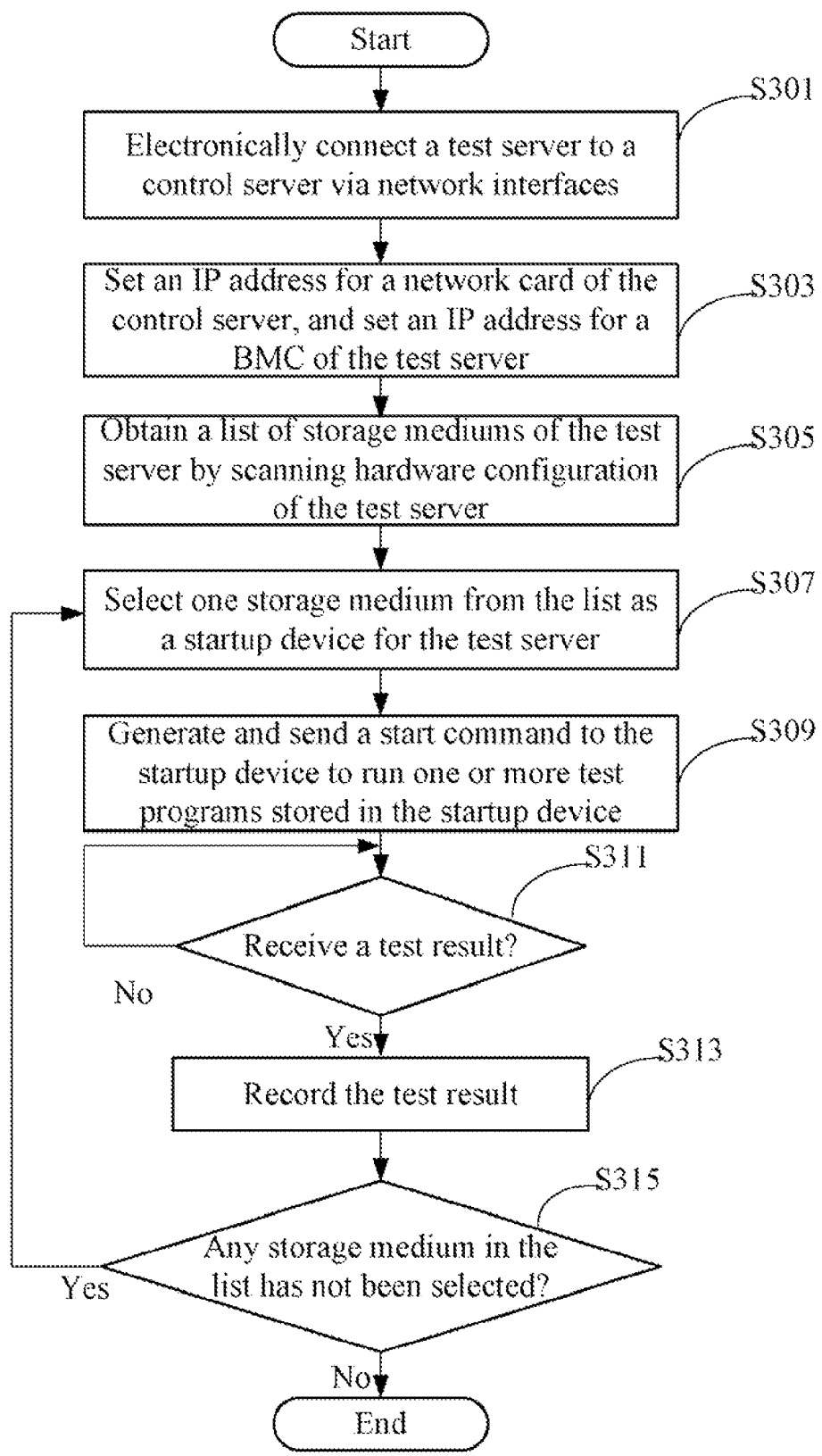
FIG. 3 is a flowchart of one embodiment of a method for switching running of test programs stored in multiple storage mediums of a test server.

FIG. 3 is a flowchart of one embodiment of a method for switching running of test programs stored in multiple storage mediums of the test server 20. Depending on the embodiment, additional steps may be added, others removed, and the ordering of the steps may be changed.

In step S301, the test server 20 is electronically connected to the control server 10 via network interfaces of the control server 10 and the test server 10. For example, as shown in FIG. 1, the network interface 21 of the test server 20 is electronically connected to the network interface 15 of the control server 10. The network interfaces may be RJ-45, for example.

In step S303, the parameter setting module 111 sets an IP address for a network card of the control server 10, sets an IP address for the BMC 26 of the test server 20, and establishes a network communication between the control server 10 and the test server 20 by enabling an intelligent platform management interface (IPMI) over a local area network (LAN) function of the BMC 26. The IP address of the network card of the control server 10 falls within the same network segment of the IP address of the BMC 26 of the test server 20. For example, the IP address of the network card of the control server 10 may be set as "192.168.1.1", and the IP address of the BMC 26 of the test server 20 may be set as "192.168.1.2". The IP address of the BMC 26 of the test server 20 should be set different from an IP address of a network card of the test server 20, to avoid IP address conflict.

In step S305, the hardware scanning module 112 scans hardware configuration of the test server 20 to obtain a list of storage mediums of the test server 20. The list may record a type and space volume of each of the storage mediums (such as the storage mediums 22-25) of the test server 20. As mentioned above, the types of the multiple storage mediums may include, but not limited to, CDs, DVDs, BLU-RAY, flash memory, and hard disk drives.

In step S307, the startup device selection module 113 selects one storage medium from the list as a startup device for the test server 20. For example, the storage medium 22 may be selected as the startup device. In one embodiment, the storage medium 22 stores one or more test programs for testing network capability of the test server 20.

In step S309, the command generation module 114 generates and sends a start command to the startup device to run one or more test programs stored in the startup device for performing a test task of the test server 20. For example, after receiving the start command, the BMC 26 starts the one or more test programs stored in the storage medium 22 to test network capability of the test server 20.

In step S311, the result receiving module 115 determines if a test result has been received from the startup device (such as the storage medium 22). The test result may include a name of the test task (such as a network capability test), time spent on the test task, and whether the test task passes the test or fails the test. If no test result has been received, the result receiving module 115 determines the test task has not been completed and goes on waiting for the test result. If the test result has been received, in step S313, the result receiving module 115 stores the test result into the storage device 12.

In step S315, the determination module 116 determines if there is any storage medium in the list that has not been selected as the startup device. If there is any storage medium in the list that has not been selected as the startup device of the test server 20, repeats from step S307 for selecting a new startup device of the test server 20 until all storage mediums in the list have been selected as startup devices one by one, to achieve automatically running the test programs stored in the storage mediums in turn.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being performed by a processor of a control server for switching running of multiple test programs stored in multiple storage mediums of a test server, comprising:
   electronically connecting the test server to the control server via network interfaces of the control server and the test server;
   setting an IP address for a network card of the control server and an IP address for a baseboard management controller (BMC) of the test server, and establishing a network communication between the control server and the test server by enabling an intelligent platform management interface (IPMI) over a local area network (LAN) function of the BMC;
   obtaining a list of the multiple storage mediums of the test server by scanning hardware configuration of the test server;
   selecting one storage medium from the list as a startup device of the test server, and running one or more test programs stored in the startup device for performing a test task of the test server;
   in response to receiving a test result from the test server, repeating the selecting step until all the storage mediums in the list have been selected as the startup device.

2. The method of claim 1, wherein the IP address of the network card of the control server falls within the same network segment of the IP address of the BMC of the test server.

3. The method of claim 1, wherein the IP address of the BMC of the test server is different from an IP address of a network card of the test server.

4. The method of claim 1, wherein the test task is selected from the group consisting of network capability tests, input/output (I/O) capability tests, and hardware component capability tests of the test server.

5. The method of claim 1, wherein the test result comprises a name of the test task, time spent on the test task, and whether the test task passes the test or fails the test.

6. A non-transitory storage medium storing a set of instructions, the set of instructions capable of being performed by a processor of a control server for switching running of multiple test programs stored in multiple storage mediums of a test server, the method comprising:
   electronically connecting the test server to the control server via network interfaces of the control server and the test server;
   setting an IP address for a network card of the control server and an IP address for a baseboard management controller (BMC) of the test server, and establishing a network communication between the control server and the test server by enabling an intelligent platform management interface (IPMI) over a local area network (LAN) function of the BMC;
   obtaining a list of the multiple storage mediums of the test server by scanning hardware configuration of the test server;
   selecting one storage medium from the list as a startup device of the test server, and running one or more test programs stored in the startup device for performing a test task of the test server;
   in response to receiving a test result from the test server, repeating the selecting step until all the storage mediums in the list have been selected as the startup device.

7. The medium of claim 6, wherein the IP address of the network card of the control server falls within the same network segment of the IP address of the BMC of the test server.

8. The medium of claim 6, wherein the IP address of the BMC of the test server is different from an IP address of a network card of the test server.

9. The medium of claim 6, wherein the test task is selected from the group consisting of network capability tests, input/output (I/O) capability tests, and hardware component capability tests of the test server.

10. The medium of claim 6, wherein the test result comprises a name of the test task, time spent on the test task, and whether the test task passes the test or fails the test.

11. A control server, comprising:
   a storage device;
   a processor:
   a network interface electronically connected with a network interface of a test server;

one or more programs that are stored in the storage device and being executed by the processor, the one or more programs comprising:

a parameter setting module operable to set an IP address for a network card of the control server and an IP address for a baseboard management controller (BMC) of the test server, and establish a network communication between the control server and the test server by enabling an intelligent platform management interface (IPMI) over a local area network (LAN) function of the BMC;

a hardware scanning module operable to obtain a list of multiple storage mediums of the test server by scanning hardware configuration of the test server;

a startup device selection module operable to select one storage medium from the list as a startup device of the test server in response that a test result has been received from the test server;

a command generation module operable to generate and send a start command to the startup device to run one or more test programs stored in the startup device for performing a test task of the test server;

a determination module operable to determine if there is any storage medium in the list that has not been selected as the startup device; and the startup device selection module further operable to select a next storage medium from the list as a new startup device, and the command generation module further operable to send a next control command to run one or more test programs stored in the new staring device until all the storage mediums in the list have been selected as startup devices one by one.

12. The control server of claim 11, wherein the IP address of the network card of the control server falls within the same network segment of the IP address of the BMC of the test server.

13. The control server of claim 11, wherein the IP address of the BMC of the test server is different from an IP address of a network card of the test server.

14. The control server of claim 11, wherein the test task is selected from the group consisting of network capability tests, input/output (I/O) capability tests, and hardware component capability tests of the test server.

15. The control server of claim 1, wherein the one or more programs further comprise a test result receiving module operable to receive the test result send from the test server.

16. The control server of claim 15, wherein the test result comprises a name of the test task, time spent on the test task, and whether the test task passes the test or fails the test.

* * * * *